Nov. 12, 1940.  H. N. CARVER  2,220,953
SIGNALING DEVICE
Filed April 21, 1938
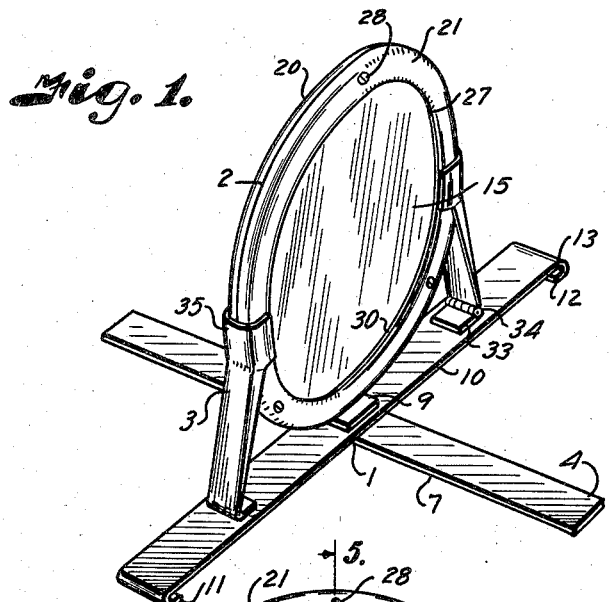
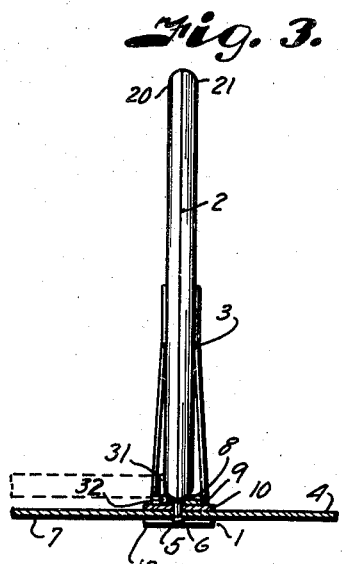
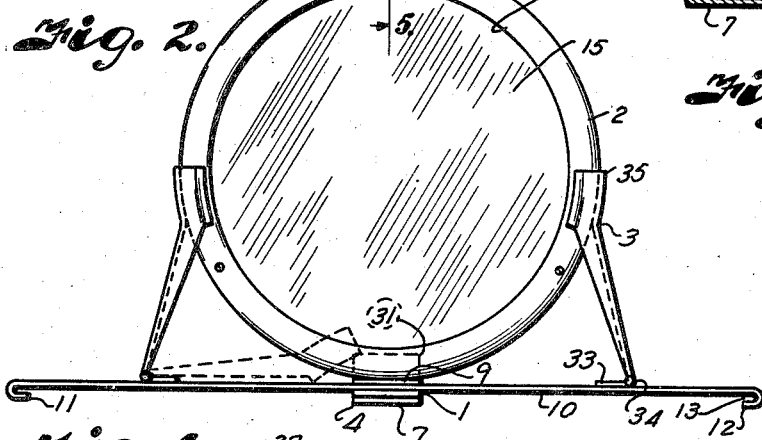
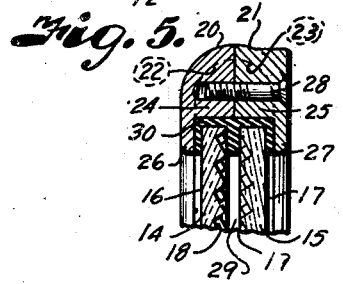
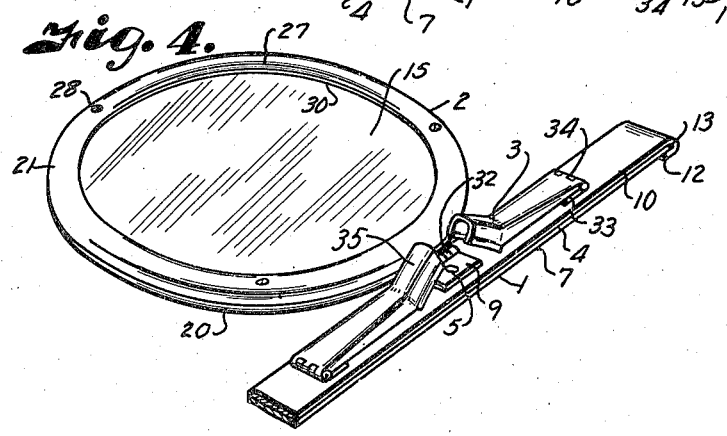
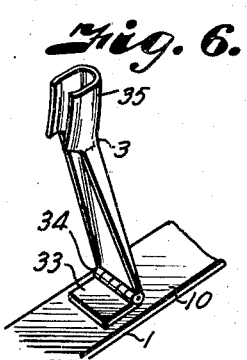
INVENTOR
Horace N. Carver.
BY
ATTORNEY Patented Nov. 12, 1940

2,220,953

UNITED STATES PATENT OFFICE 2,220,953

SIGNALING DEVICE

Horace N. Carver, Wichita, Kans.

Application April 21, 1938, Serial No. 203,345

5 Claims. (Cl. 248—127)

This invention relates to signaling devices and more particularly to a portable signal adapted to be conveniently placed on highways and similar thoroughfares for warning motorists and the like of obstructions on a highway.

It is ordinarily difficult for operators of vehicles such as loaded trucks to pull off the road when it becomes necessary to make repairs on the vehicles under their control. Should the motor of a truck fail or the tires need changing, the stalled or otherwise stationary vehicle creates a hazard on the road, not only to approaching motorists, but also to the truck operators and the property under their control.

It is the principal object of the present invention to provide a signal of the character commonly known as a "road flare" which is capable of reflecting and/or refracting light rays, generated by the lights of approaching vehicles, back approximate their source of incidence to warn the occupants of those vehicles of the presence of obstructions on roads.

Other important objects of the present invention are to provide a collapsible light reflecting and/or refracting signal of sturdy and durable construction capable of withstanding shocks and jars without damage to the signal; to so design the signal that it is difficult to tip over accidentally; to provide a compact and easily operable signal of a high degree of efficiency; to provide a protective mounting for the reflector or light refracting element of the signal; to provide a collapsible base or supporting standard for the signaling device for the purpose of conserving space when the device is to be stored; to provide collapsible members for selectively maintaining the signaling element in erected or operative condition; and to provide improved parts and arrangements of parts making up a signaling device of this character.

In accomplishing these and other objects of the present invention, I have provided improved details of structure, the preferred form of which is illustrated in the accompanying drawing, wherein:

Fig. 1 is a perspective view of a signaling device embodying the features of the present invention and showing the device in erected condition.

Fig. 2 is a side elevational view of the signaling device, one of the bracket arms for retaining the signaling element in erected condition being shown in dotted lines in collapsed position.

Fig. 3 is an end elevational view of the signaling device, the base being shown in horizontal cross-section and the position of the signaling element relative to the base when in collapsed condition being shown in dotted lines.

Fig. 4 is a perspective view of the signaling device embodying the present invention showing the same in collapsed condition adapted for storing.

Fig. 5 is a detail vertical cross-section through a portion of the signaling element of the device on the line 5—5, Fig. 2.

Fig. 6 is a detail perspective view of one of the bracket arms for retaining the signaling element in erected condition.

Referring more in detail to the drawing:

A signaling device embodying the present invention preferably includes a collapsible base 1, and a signaling element 2 hingedly mounted on the base. Bracket arms 3 adapted for engagement with the signaling element are preferably provided on the base to selectively retain the signaling element in erected condition.

More particularly, the collapsible base 1 preferably consists of an elongated member 4 of strap iron or the like, which is pivoted at its center, as shown in Figs. 3 and 4, by a pivot pin 5 having a retaining head 6 at one end engaged with the underface 7 of the member 4 and having a retaining head 8 on its other end engaged with a hinge plate 9 or the like mounted on the upper face of an elongated cooperating base member 10 of a material similar to the base member 4. The base member 10 preferably has inwardly turned ends 11 and 12 spaced from the underface thereof to provide a socket 13 or the like into which the ends of the base member 4 may be turned to collapse the base and thus require less storage space when the signaling device is not in use.

The signaling element 2 preferably comprises oppositely disposed plates 14 and 15, Fig. 5, each preferably formed of colored rolled glass or similar substantially transparent material having suitable outer faces 16 and 17 and preferably prismatic inner faces 18 and 19 for reflecting and/or refracting light rays impinging against the outer faces thereof back approximate the sources of incidence of such rays. The peripheral edges of the signal plates 14 and 15 are mounted within mating frame members 20 and 21, Fig. 3, which are preferably of substantially circular or ring-shape and of any suitable diameter. The frames preferably have concaved inner surfaces, as indicated by the dotted lines 22 and 23 in Fig. 5, and are provided with spaced alignable bosses on such inner surfaces, a cross-section through which is indicated at 24 and 25 in Fig. 5, these bosses being interengageable when the frames are in adjacent relation. The bosses 24 and 25 terminate short of the inner edges 26 and 27 of the frames to form seats for the peripheral edges of the signal plates 14 and 15. The outer side edges of the plates are arranged for engagement by the edges 26 and 27 respectively of the frames, which edges secure the plates in position in the frame. The signal plate frames are preferably secured together in a suitable manner as by the extension of fastening devices 28 through aligned apertures in the frames and bosses.

As a matter of practice, the signal plates 13 and 14 are preferably spaced as shown at 29, in Fig. 5, and the peripheral edges of the plates are engaged in the grooves of a preferably E-shaped gasket 30 of sponge rubber or similar material mounted in the signal plate frames for cushioning the signal plates relative to their support and thereby permitting relatively rough treatment of the assembled devices without danger of breaking the signal plates. The space 29 between the signal plates obviously separates the plates and provides an advantage for the device in that when one of the plates is broken, the other may still be used, the gasket acting to hold the unbroken signal plate in its frame in such a manner that the signaling device may be employed to warn approaching motorists from at least one direction.

In order to mount the signaling element on the collapsible base, the plate 9 is employed as one leaf of a hinge, the other leaf 31 of the hinge, Fig. 2, being secured in a suitable manner to the frame 20 of the signaling element, the leaf 31 forming a hinging device to connect the signaling element to the base. Suitable hinging elements 32 are interposed preferably substantially in the horizontal plane of the base members 4 and 10 between the leaves 9 and 29 for interconnecting the same to provide a pivotal connection between the collapsible base and signaling element.

The bracket arms 3 each preferably comprise a hinge leaf 33 suitably fixed to the base member 10 in spaced relation to the hinges 9—31. The counterpart of the hinge leaf 33 which is connected thereto in a suitable manner as indicated at 34, preferably on a horizontal axis, comprises a bracket arm of substantially channel shape terminating at its upper end in a clip member 35 of a size adapting it for clipping engagement with the outer surface of the frames 20 and 21 of the signaling element to engage the same and retain the signaling element in erected or operative condition.

The operation of a signaling device constructed as described is as follows:

Assuming the device to be in collapsed or stored condition, as shown in Fig. 4; when it is desired to employ the same for warning approaching motorists of obstructions on the road, the base member 4 is pivoted from the position shown in Fig. 4 to that shown in Fig. 1 to provide a pair of crossing base members covering a substantial area to provide an adequate support for the signaling element. The signaling element is then hinged on its hinge leaves 9 and 31 to an erect position, as shown in Fig. 3, the bracket arms first having been hinged outwardly relative to the base member 10 to provide clearance for the stated position of the signaling element. The bracket arms are then forced inwardly whereupon the clip end members 35 thereof engage about and press against the frame members 20 and 21 to retain the signaling element in erected condition.

When the signalling device has served its immediate purpose and is again ready for storage, the bracket arms are forced outwardly to release the signaling element which may then be hinged downwardly to permit the bracket arms to be hinged inwardly to the collapsed condition shown in Fig. 4. The base member 4 is then pivoted in such a manner that the ends thereof engage in the sockets 13 at the ends of the base member 10 and the signaling device is then ready for storage in its collapsed condition.

It is apparent that the present device may be placed either in front of and behind a vehicle on a road and that either of the signal plates may be faced toward either direction of approaching traffic on a highway to warn the occupants of approaching vehicles of the presence of an obstruction on the highway.

The principal advantages of a signaling device embodying the features of the present invention are that it is strong, rigid, durable and withstands rough treatment.

The device is very compact and may be conveniently stored in any type of vehicle. Light rays may be reflected and/or refracted from either side of the signal element. Further, should one of the signal plates be broken, the other signal plate is still effective to warn approaching motorists of the presence of obstructions to thus protect lives and property. Further, the device is light, inexpensive to manufacture, easily operable, and very efficient for its intended purpose.

What I claim and desire to secure by Letters Patent is:

1. A road signal of the character described consisting of a base member adapted to rest upon the ground and form a support, a frame member adapted to carry a signaling element, said frame member being hingedly connected with said base member and normally lying substantially in the same plane as the base member, said frame member being movable to upright condition relative to and upon said base member, and means hingedly connected with one of said members and removably engageable with the other of said members, when the frame member is in upright condition, for maintaining the frame member in upright condition.

2. A road signal as defined in claim 1 wherein the means for maintaining the frame member in upright condition comprises an arm having one end hinged to the base member in spaced relation to the connection of the frame member to the base member, the unhinged end of the arm being removably engageable with the frame member, when in upright condition, to hold the frame member upright.

3. A road signal as defined in claim 1 wherein the base member consists of a plurality of pivotally connected relatively spreadable members, and the frame member is hinged to one of said members.

4. In a road signal of the character described, a base adapted to rest upon the ground and form a support, a frame adapted to carry a signaling element having a hinge substantially in the plane of the base and connecting the frame to the base for allowing the frame to lie flat in inoperative condition and to allow the frame to be moved to upright operative condition on and in angular relation to the base, and a plurality of inwardly directed arms having outer ends hinged to the base in spaced relation to each other, the inner ends of said arms normally lying on said base and being movable upwardly to allow operative positioning of the frame and removable engagement of the frame by the arms to hold the frame in operative condition.

5. In a road signal of the character described, a base adapted to rest upon the ground and form a support, a frame adapted to carry a signaling element having a hinge substantially in the plane of the base and connecting the frame to the base for allowing the frame to lie flat in inoperative condition and to allow the frame to be moved to upright operative condition on and in angular relation to the base, a plurality of inwardly directed arms having outer ends hinged to the base in spaced relation to each other, the inner ends of said arms normally lying on said base and being movable upwardly to allow operative positioning of the frame and removable engagement of the frame by the arms to hold the frame in operative condition, and clip members on the inner ends of said arms for facilitating engagement and removal of said arms relative to said frame.

HORACE N. CARVER.